United States Patent

Kulicke, Jr. et al.

[15] 3,661,316

[45] May 9, 1972

[54] AIMING DEVICE FOR SEMICONDUCTOR BONDING APPARATUS

[72] Inventors: Frederick W. Kulicke, Jr.; John J. Lepone, both of Philadelphia, Pa.

[73] Assignee: Kulicke and Soffa Industries, Inc., Fort Washington, Pa.

[22] Filed: Apr. 13, 1970

[21] Appl. No.: 27,955

[52] U.S. Cl. .......................................228/56.5, 29/589, 228/4

[51] Int. Cl. ...............................................................B23k 5/22

[58] Field of Search......................228/3, 4, 5, 3.5, 1; 219/85; 29/526, 592, 428, 203, 569, 589; 356/626, 592, 428, 203, 569, 589; 269/4; 83/520; 350/81

[56] References Cited

UNITED STATES PATENTS

| | | | |
|---|---|---|---|
| 3,050,617 | 8/1962 | Lasch, Jr. et al. | 228/3 X |
| 3,388,848 | 6/1968 | Yaumans et al. | 228/1 |

*Primary Examiner*—John F. Campbell
*Assistant Examiner*—R. J. Craig
*Attorney*—Roger S. Borovoy

[57] ABSTRACT

Apparatus for aiming a tool used to perform a mechanical operation on a semiconductor device, including a light pencil which directs a thin beam of light in the area where the tool is to be aimed. The position of the light beam indicates one of the positions of the moveable tool.

9 Claims, 3 Drawing Figures

INVENTORS
FREDERICK W. KULICKE JR.
JOHN J. LEPONE

AIMING DEVICE FOR SEMICONDUCTOR BONDING APPARATUS

FIELD OF THE INVENTION

The subject invention is in the field of semiconductor mechanical equipment, in particular, die bonders and wire bonders used for the placement of semiconductor dice on mounting platforms or "headers," and for the subsequent connection of electrical wires between positions on the semiconductor die and positions on the specially constructed header.

THE PRIOR ART

Prior to this invention, it was conventional in microscopic semiconductor die and wire attachment to use a cross-hair in the microscope for aiming the tool. The operator looks through the microscope and sights through the cross-hair to the place where she desires to direct her operating tool. When the cross-hair is aligned to the proper spot, she then performs the mechanical operation on that spot. Alternatively, the tip of the tool itself, as seen through the microscope, can be used as a means to ascertain the location of the same tool for the bonding operation. Both of these systems have some disadvantages. The use of the tool itself for optically locating its own correct position suffers from inaccuracy. The use of a cross-hair in the microscope, while being more accurate, tends to be a relatively slow way for the operator to locate the proper position. As newer, more high speed bonding mechanisms are developed, a faster, more accurate means of locating the position of the tool is needed.

BRIEF DESCRIPTION OF THE INVENTION

This invention uses a new technique for aiming a tool used to perform a mechanical operation on a semiconductor device. The tool is moveable to one of at least two different positions. The system uses a light source projecting means, such as a light pencil, for projecting a thin beam or pin point of light. The projecting means is supported on a supporting means, the supporting means being in a fixed predetermined physical relationship with a first of the two different positions of the tool, so that the position hit by the light beam is determinative of the first position of the tool irrespective of whether said tool itself is in the first position. The use of such a light beam in accordance with this invention provides a means of extremely rapid, accurate location of the bonding tool. The invention is applicable both to die bonders and to wire bonders.

In the case of a die bonder, the light pencil is aimed at a hand-moveable platform containing the dice to be bonded. The operator moves the platform beneath the beam until the pinpoint beam of light is directed on the die she desires to pick up. The support for the light beam and therefore the beam itself is fixed. The spot where the beam hits the die determines where the pickup needle or bonding tool will engage the die.

In the case of a wire bonder, the light beam is attached to the moveable wire bonding needle or bonding tool. The point at which the beam hits the place to which the wire is to be attached is the exact spot to which the wire bond needle will bond the wire once the mechanism for wire bonding is actuated.

Both of these embodiments of the invention will be explained in more detail hereafter, referring to the drawings, in which.

DESCRIPTION OF THE INVENTION

Figure 1:
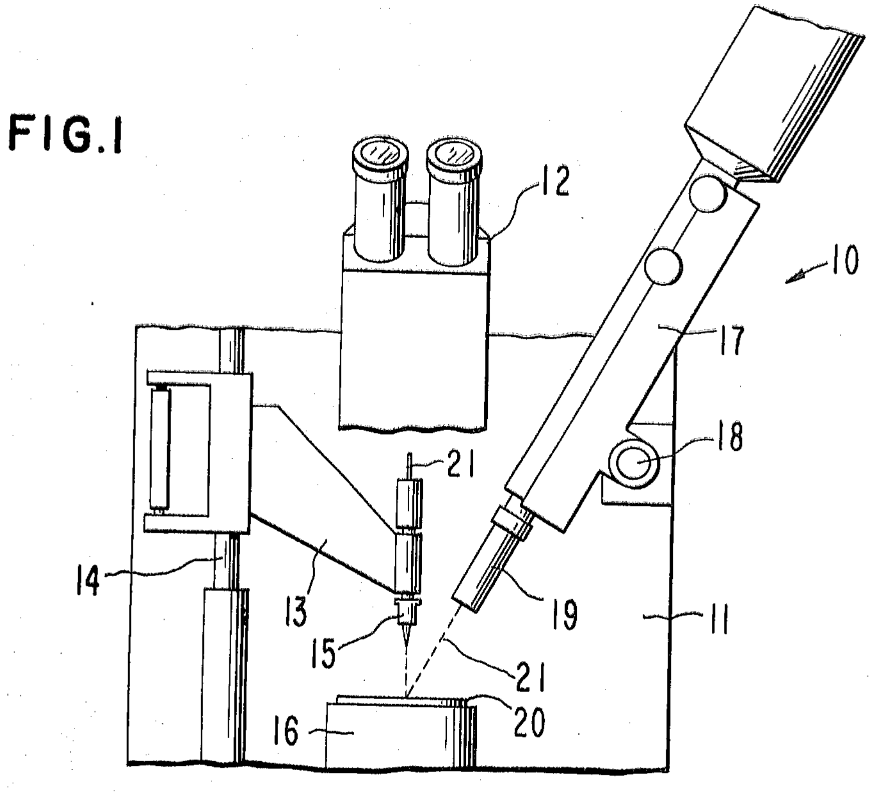
FIG. 1 is a pictorial view of the aiming mechanism of this invention.

Referring to FIG. 1, the semiconductor bonding apparatus 10 has a main body 11 to which microscope 12, support column 14, and light pencil 17 are mounted. Light pencil 17 is hinged on main body 11 by hinge mechanism 18. The bonding tool 15 is connected to tool support arm 13 which, in turn, is slideably mounted upon support column 14.

Light pencil 19 is connected to light pencil support 17 and directs light beam 21 at dice 20 on platform 16. Tool 15 has at least two different locations. The tool changes locations by swinging on support column 14. One of the locations is a forward location (illustrated); the other is a rearward location. In the embodiment illustrated in FIG. 1, light beam 21 of light pencil 19 is directed at a place on platform 16 to coincide with the forward location of tool 15. Platform 16 supports semiconductor dice 20. This platform is moved by the operator so that pin point beam 21 is directed at the particular one of the semiconductor dice 20 which she selects. She then actuates the machine by a mechanical lever (not shown) causing support arm 13 and attached tool 15 first to slide forward (if it is in the rearward position) and then to slide downwardly on column 14 and pick up the selected one of the dice 20. A vacuum is applied through tube 21 so that, once the tool 15 comes near the selected one of the dice 20, that die is picked up by the vacuum on the end of the tool. Arm 13 is again raised on column 14 and the selected die is removed from platform 16 and bonded to a substrate such as support 40 (FIG. 3).

Figure 2:
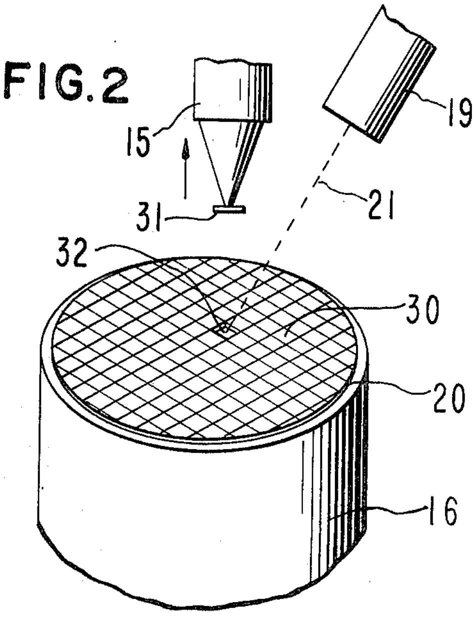
FIG. 2 is a pictorial view of an embodiment of the invention used for die bonding.

Referring to FIG. 2, the tool 15 is shown after it has removed die 31 from the group of dice 20 on platform 16. The area 32 of platform 16 without a die shows the aperture where die 31 has been removed. Note that beam 21 is directed at that aperture. The point where beam 21 from pencil 19 hits die 31 is the location at which tool 15 will pick up a die when the mechanism is actuated. Support 17 (shown in FIG. 1) has a fixed predetermined physical relationship with the forward position of tool 15 so that tool 15 will pick up the exact die which is lighted by beam 21, as shown in FIG. 2. The operator easily sees the light dot on the selected die through microscope 12 (FIG. 1). The remaining dice, such as die 30, stay on the platform 16 for future pickup. The light source 17, when fixed relative to the main body 11, may be incorporated in or with the microscope 12.

Figure 3:
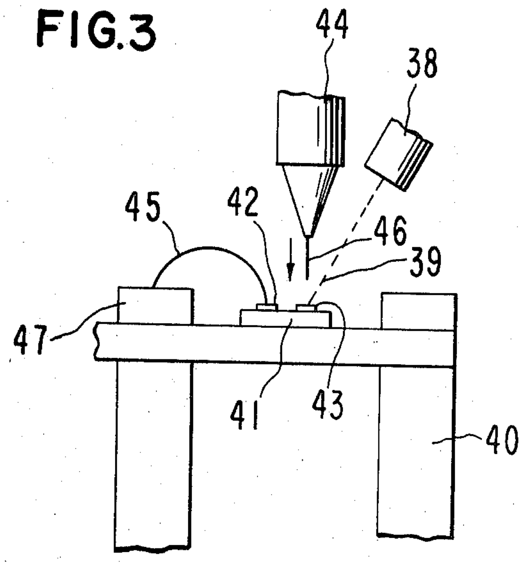
FIG. 3 is a pictorial view of an embodiment of the invention used for wire bonding.

Another embodiment of the invention is shown in FIG. 3. Support 40 has attached to it a die 41, of the same type as die 31 in FIG. 2. Die 41 has two pads 42 and 43. Tool 44 is used to attach wire 45 to pad 42 and to the top of post 47. Light pencil 38 has a fixed predetermined relationship with tool 44, being rigidly connected and moveable together with tool 44. The beam hits the spot on die 41 or on support 40 where tool 44, when actuated, will attach wire 46. Thus, when the operator actuates the mechanism, tool 44 will be lowered to bond wire 46 to pad 43 to which beam 39 is directed. The spot of light from beam 39 can be seen by the operator on pad 43 through the microscope 12 (FIG. 1) when the tool is in the position shown in FIG. 3. Alternatively, tool 44 and light pencil 38 can be moved together to direct beam 39 to the top of supporting post 47. When beam 39 was in that position, wire 45 was bonded to the top of post 47.

Obviously, the beam of light as generally described in this invention can be used on other types of equipment where the location of a mechanical tool is accomplished while looking through a microscope. Therefore the only limitations on the scope of this invention are those which are set forth in the claims which follow.

What is claimed is:

1. A means for aiming a tool used to perform a mechanical operation on a semiconductor device comprising:
   - a tool moveable to one of at least two different positions one of which is for performing an operation on said device;
   - a projecting means for projecting a thin directed beam of light said beam being sufficiently thin so as to project a spot of light onto the surface of said semiconductor device, said spot being of less area than the area of said surface of said device;

supporting means supporting said projecting means, said supporting means being in a fixed predetermined physical relationship with a first of said two different positions of said tool so that the position on said semiconductor device hit by said directed light beam is determinative of the location on said surface of said device of said first position of said tool irrespective of whether said tool itself is in said first position whereby the location of said projected spot within the area of said surface of said device determines the point of contact of said tool on said surface when said tool moves to said first position.

2. The apparatus of claim 1 further characterized by said tool and said projecting means being rigidly connected and moveable together.

3. The apparatus of claim 1 further characterized by said beam being fixed in a single location and the addition of a moveable platform holding a plurality of semiconductor devices, said beam being aimed at one of said platform.

4. The apparatus of claim 1 further characterized by said beam being fixed in a single location and supported by a microscope employed to observe the mechanical operation.

5. Apparatus for rapidly engaging a bonding tool with a predetermined point on a semiconductor device comprising:

a base for supporting a semiconductor device;

a bonding tool supported on said base for vertical movement relative to the semiconductor device;

a light source supported by said base having means for producing a directed pin point light beam said beam being sufficiently thin so as to project a spot of light onto the surface of said semiconductor device, said spot being of less area than the area of said surface of said device;

means for directing the pin point light beam onto a predetermined point on the semiconductor device;

and means connected to said base for moving the bonding tool into contact with said semiconductor device at said predetermined point whereby the location of said projected spot within the area of said surface of said device determines the point of contact of said tool on said surface when said tool moves to said first position.

6. Apparatus as set forth in claim 5, which further includes means for moving said semiconductor device relative to said bonding tool.

7. Apparatus as set forth in claim 6 which further includes means for moving said bonding tool relative to said semiconductor device.

8. Apparatus as set forth in claim 7 which further includes means fixedly connecting said light source to said means for moving said bonding tool.

9. Apparatus as set forth in claim 7 wherein said bonding tool is moveable horizontally relative to said light source and which further includes means supporting said semiconductor device on said base moveable relative to said light source.

* * * * *